(12) United States Patent
Yawata

(10) Patent No.: US 8,363,353 B2
(45) Date of Patent: Jan. 29, 2013

(54) SPINDLE MOTOR, DISK DRIVE APPARATUS, AND METHOD OF MANUFACTURING SPINDLE MOTOR

(75) Inventor: Atsushi Yawata, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/365,286

(22) Filed: Feb. 3, 2012

(65) Prior Publication Data

US 2012/0200957 A1    Aug. 9, 2012

(30) Foreign Application Priority Data

Feb. 7, 2011  (JP) ................................ 2011-023460

(51) Int. Cl.
*G11B 17/02*    (2006.01)
(52) U.S. Cl. .................................................. 360/99.08
(58) Field of Classification Search ............... 360/97.11, 360/99.08, 92.1, 97.19, 98.01, 125.01, 234.3, 360/99.23
See application file for complete search history.

(56) References Cited

U.S. PATENT DOCUMENTS

| | | | |
|---|---|---|---|
| 5,541,789 A * | 7/1996 | Fukuoka et al. ............ 360/234.1 |
| 5,572,381 A | 11/1996 | Stewart | |
| 6,118,198 A | 9/2000 | Hollenbeck et al. | |
| 6,652,324 B2 | 11/2003 | Maiers et al. | |
| 6,771,460 B2 | 8/2004 | Nii et al. | |
| 7,012,191 B1 | 3/2006 | Watanabe et al. | |
| 7,105,963 B2 | 9/2006 | Ito et al. | |
| 7,144,275 B2 | 12/2006 | Iida | |
| 7,254,882 B2 | 8/2007 | Ito et al. | |
| 7,684,146 B1 | 3/2010 | Andrikowich et al. | |
| 7,757,378 B1 | 7/2010 | Mann et al. | |
| 8,120,872 B2 | 2/2012 | Sekii et al. | |
| 8,164,851 B2 | 4/2012 | Yoneda et al. | |
| 2005/0206255 A1 | 9/2005 | Yoshino et al. | |
| 2006/0023339 A1 | 2/2006 | Fukuyama et al. | |
| 2006/0281229 A1 | 12/2006 | Koh et al. | |
| 2009/0195095 A1 | 8/2009 | Yawata et al. | |
| 2009/0316299 A1 | 12/2009 | Tashiro et al. | |
| 2010/0329104 A1 | 12/2010 | Yawata et al. | |

FOREIGN PATENT DOCUMENTS

| | | |
|---|---|---|
| JP | 07-075275 A | 3/1995 |
| JP | 07-107693 A | 4/1995 |
| JP | 07-222386 A | 8/1995 |

(Continued)

OTHER PUBLICATIONS

Yawata et al., "Spindle Motor and Storage Disk Drive Apparatus", U.S. Appl. No. 13/352,442, filed Jan. 18, 2012.

(Continued)

*Primary Examiner* — Allen Cao
(74) *Attorney, Agent, or Firm* — Keating & Bennett, LLP

(57) ABSTRACT

In a spindle motor, a lead wire extending from a coil includes a first solder portion coated with a first solder. The lead wire is arranged to extend downward through a base hole portion and a board hole portion. The first solder portion is soldered to a circuit board through a second solder portion. An upper end portion of the first solder portion is arranged above an upper surface of the circuit board such that $d1>(d2-d3)/2$ is satisfied, where $d1$ denotes the axial distance between the upper end portion of the first solder portion and the upper surface of the circuit board, $d2$ denotes an opening width of the board hole portion, and $d3$ denotes the diameter of the lead wire.

20 Claims, 8 Drawing Sheets

FOREIGN PATENT DOCUMENTS

| JP | 07-334967 A | | 12/1995 |
|---|---|---|---|
| JP | 11-218128 A | | 8/1999 |
| JP | 2000-209804 A | | 7/2000 |
| JP | 2000-306319 A | | 11/2000 |
| JP | 2001-067775 A | | 3/2001 |
| JP | 2005-057892 A | | 3/2005 |
| JP | 2005-210787 A | | 8/2005 |
| JP | 2006-040423 A | | 2/2006 |
| JP | 2006-100252 A | | 4/2006 |
| JP | 2006-185553 A | | 7/2006 |
| JP | 2006-187145 A | | 7/2006 |
| JP | 2009-110611 A | | 5/2009 |
| JP | 2009110611 A | * | 5/2009 |
| JP | 2009-189157 A | | 8/2009 |
| JP | 2010-009644 A | | 1/2010 |
| JP | 2011-114892 A | | 6/2011 |

OTHER PUBLICATIONS

Yawata et al., "Spindle Motor and Storage Disk Drive Apparatus", U.S. Appl. No. 13/352,445, filed Jan. 18, 2012.

Sugi et al., "Spindle Motor, Disk Drive Apparatus, and Method of Manufacturing Spindle Motor", U.S. Appl. No. 13/241,773, filed Sep. 23, 2011.

Sugi et al., "Motor Unit and Disk Drive Apparatus", U.S. Appl. No. 13/290;209, filed Nov. 7, 2011.

Sugi et al., "Spindle Motor, and Disk Drive Apparatus Including the Spindle Motor", U.S. Appl. No. 13/334,620, filed Dec. 22, 2011.

Matsuyama et al.,"Spindle Motor, Disk Drive Apparatus, and Method of Manufacturing Spindle Motor", U.S. Appl. No. 13/424,632, filed Mar. 20, 2012.

Watanabe, "Method of Manufacturing Motor, Motor, and Disk Drive Apparatus", U.S. Appl. No. 13/437,103, filed Apr. 2, 2012.

Watanabe et al., "Spindle Motor and Disk Drive Apparatus", U.S. Appl. No. 61/625,128, filed Apr. 17, 2012.

Watanabe et al., "Base Unit, Spindle Motor, and Disk Drive Apparatus", U.S. Appl. No. 61/625,132, filed Apr. 17, 2012.

Saichi et al.; "Spindle Motor Having Connecting Mechanism Connecting Lead Wire and Circuit Board, and Storage Disk Drive Having the Same", U.S. Appl. No. 13/029,143, filed Feb. 17, 2011.

* cited by examiner

SPINDLE MOTOR, DISK DRIVE APPARATUS, AND METHOD OF MANUFACTURING SPINDLE MOTOR

BACKGROUND OF THE INVENTION

1. Field of the Invention

The present invention relates to a spindle motor, a disk drive apparatus, and a method of manufacturing the spindle motor.

2. Description of the Related Art

Spindle motors arranged to rotate magnetic disks are usually installed in conventional hard disk drives. Such spindle motors include a stationary portion and a rotating portion. The stationary portion is fixed to a housing of the drive. The rotating portion is arranged to rotate while holding a magnetic disk. The spindle motor is arranged to generate a torque centered on a central axis through magnetic flux generated between the stationary portion and the rotating portion, so that the rotating portion is caused to rotate with respect to the stationary portion.

The stationary portion of the spindle motor includes coils arranged to generate the magnetic flux. End portions of conducting wires which define the coils are drawn out of the spindle motor, and soldered to a circuit board. For example, paragraph [0026] of JP-A 2009-110611 states that a copper wire portion of a coil wire is drawn out through a through hole, and soldered to a land portion of a flexible circuit board.

During a process of manufacturing a spindle motor, ultrasonic cleaning is typically performed after the above-described soldering to remove an extraneous material. However, if the spindle motor having the above-described structure is subjected to the ultrasonic cleaning, it may happen that stresses due to ultrasonic wave vibration are concentrated on a boundary region between the conducting wire and a solder. In order to prevent a break of the conducting wire from occurring due to this stress concentration, a known technique subjects the spindle motor to the cleaning with a reduced power of the ultrasonic wave vibration.

Regarding this problem, JP-A 2009-110611 describes a technique of arranging an outer circumference of a solder portion to have a diameter greater than that of a through hole of a base in order to prevent breakage of the coil wire. However, this technique is intended to improve rigidity of the solder portion and a small diameter portion of the flexible circuit board, and to thereby reduce vibrations of these portions, as described in paragraph [0032] of JP-A 2009-110611. However, JP-A 2009-110611 does not mention a technique that prevents the above-described stress concentration.

Note that potential causes for the above-described stress concentration are not limited to the vibrations that occur at the time of the ultrasonic cleaning, but also include a variety of exterior shocks, such as, for example, vibrations that occur while the spindle motor is being carried or vibrations that occur while the spindle motor is being used.

SUMMARY OF THE INVENTION

A spindle motor according to a preferred embodiment of the present invention includes a stationary portion and a rotating portion. The rotating portion is supported to be rotatable about a central axis extending in a vertical direction with respect to the stationary portion. The stationary portion preferably includes a base portion, a coil, and a circuit board. The base portion is arranged to extend radially outward around the central axis. The coil is arranged above the base portion. The circuit board is fixed to a lower surface of the base portion. A lead wire extending from the coil includes a first solder portion. The first solder portion is coated with a first solder. The base portion includes a base hole portion. The base hole portion is defined by a through hole. The circuit board includes a board hole portion. The board hole portion is preferably defined by a through hole, a cut, or a slit. The board hole portion is defined at a position overlapping with the base hole portion. The lead wire is arranged to extend downward through the base hole portion and the board hole portion. The first solder portion is preferably soldered to the circuit board through a second solder portion. An upper end portion of the first solder portion is arranged above an upper surface of the circuit board. Accordingly, the inequality: $d1>(d2-d3)/2$, is preferably met where $d1$ denotes an axial distance between the upper end portion of the first solder portion and the upper surface of the circuit board, $d2$ denotes an opening width of the board hole portion, and $d3$ denotes a diameter of the lead wire.

A method of manufacturing a spindle motor according to a preferred embodiment of the present invention includes the following steps a), b), c), and d). A spindle motor manufactured according to the present preferred embodiment of the present invention includes a base portion, a coil, and a circuit board. The base portion is arranged to extend radially outward around a central axis extending in a vertical direction. The coil is arranged above the base portion. The circuit board is preferably fixed to a lower surface of the base portion. In step a), the coil, which includes a lead wire, is prepared. In step b), the coil is arranged above the base portion. In step c), the lead wire is soldered to the circuit board, with the lead wire drawn out beyond a lower surface of the circuit board. In step d), a unit preferably including the base portion, the coil, and the circuit board is immersed in a liquid, and ultrasonic wave vibration is applied to the liquid. The lead wire preferably includes a first solder portion previously coated with a solder, the first solder portion being defined near a tip portion of the lead wire. Step b) preferably includes passing the lead wire through a base hole portion and a board hole portion, thereby drawing out the lead wire downwardly. The base hole portion is defined by a through hole defined in the base portion. The board hole portion is preferably defined by a through hole, a cut, or a slit defined in the circuit board. Step c) includes positioning the lead wire such that $d1>(d2-d3)/2$, where $d1$ denotes an axial distance between an upper end portion of the first solder portion and an upper surface of the circuit board, $d2$ denotes an opening width of the board hole portion, and $d3$ denotes a diameter of the lead wire.

In the spindle motor according to the first preferred embodiment of the present invention described above, the second solder portion rises along the first solder portion above the board hole portion. This results in an increase in an area where the lead wire and the second solder portion are in contact with each other. This contributes to reducing the likelihood of a concentration of stress on a boundary region between the lead wire and the second solder portion due to an exterior shock. This in turn contributes to preventing breakage of the lead wire.

In accordance with the method of manufacturing the spindle motor according to the second preferred embodiment of the present invention described above, a solder rises along the first solder portion above the board hole portion in step c). This results in an increase in area where the lead wire and the solder are in contact with each other. This contributes to reducing the likelihood of concentration of stress on a boundary region between the lead wire and the solder due to an exterior shock. Therefore, it is possible to subject the unit including the base portion, the coil, and the circuit board to ultrasonic cleaning while also preventing breakage of the lead wire.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis extends, and that a side on which coils are arranged with respect to a circuit board is defined as an upper side. The shape of each member or portion and relative positions of different members or portions will be described based on the above assumptions. It should be noted, however, that the above definitions of the vertical direction and the upper side are made simply for the sake of convenience in description, and should not be construed to restrict in any way the orientation of a spindle motor or a disk drive apparatus according to any preferred embodiment of the present invention when in actual use.

Figure 1:
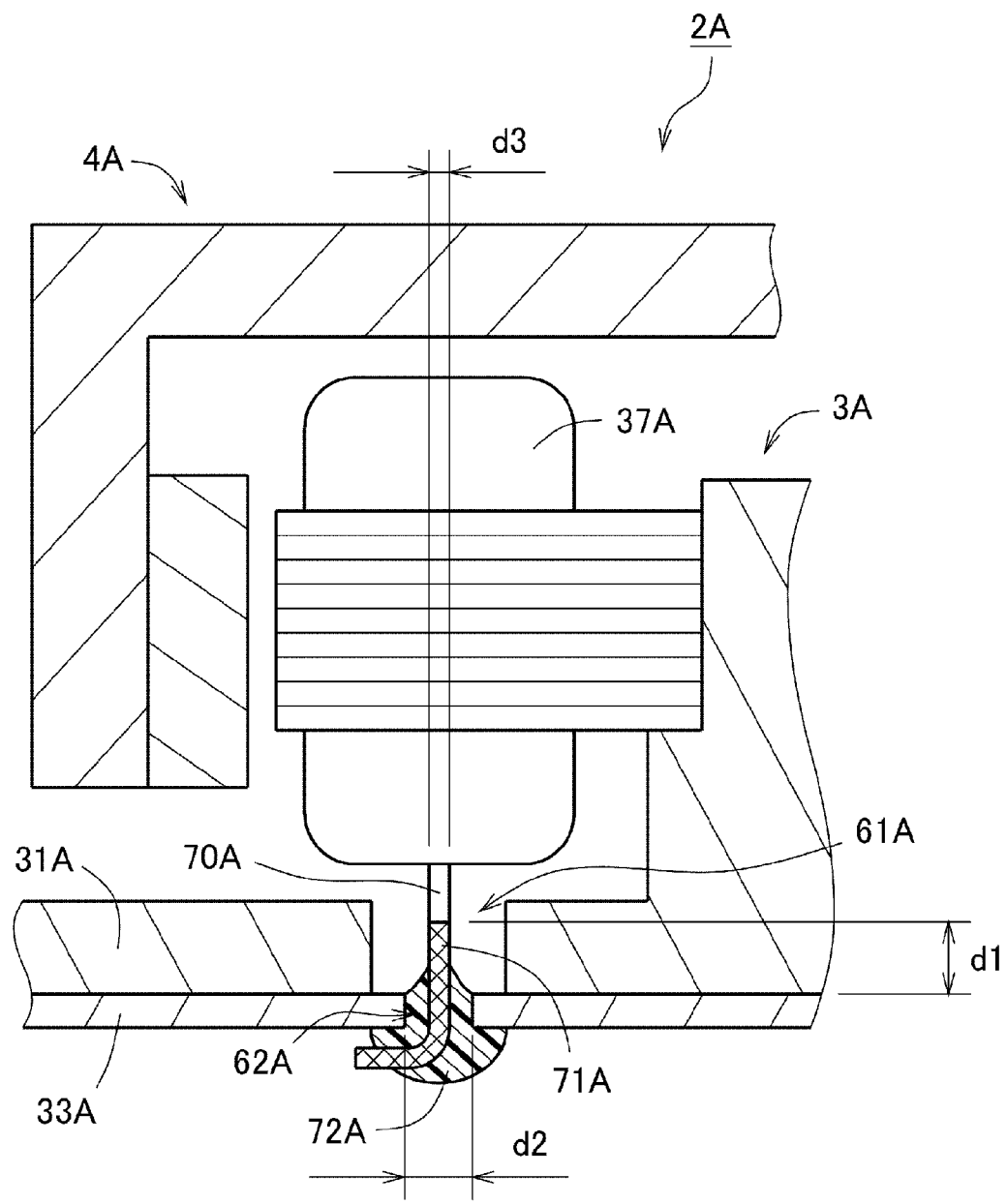
FIG. 1 is a partial vertical cross-sectional view of a spindle motor according to a preferred embodiment of the present invention.

FIG. 1 is a partial vertical cross-sectional view of a spindle motor 2A according to a preferred embodiment of the present invention. As illustrated in FIG. 1, the spindle motor 2A includes a stationary portion 3A and a rotating portion 4A. The rotating portion 4A is supported to be rotatable about a central axis extending in a vertical direction with respect to the stationary portion 3A.

The stationary portion 3A preferably includes a base portion 31A, a coil 37A, and a circuit board 33A. The base portion 31A is arranged to extend radially outward around the central axis. The coil 37A is preferably arranged above the base portion 31A. The circuit board 33A is preferably fixed to a lower surface of the base portion 31A.

The base portion 31A includes a base hole portion 61A defined by a through hole. The circuit board 33A includes a board hole portion 62A preferably defined by, for example, a through hole, a cut, or a slit. The board hole portion 62A is preferably arranged at a position overlapping with the base hole portion 61A. A lead wire 70A arranged to extend from the coil 37A includes a first solder portion 71A coated with a first solder. The lead wire 70A is arranged to extend downward through both the base hole portion 61A and the board hole portion 62A. The first solder portion 71A is soldered to the circuit board 33A through a second solder portion 72A.

An upper end portion of the first solder portion 71A is arranged above an upper surface of the circuit board 33A. Assume here that d1 denotes the axial distance between the upper end portion of the first solder portion 71A and the upper surface of the circuit board 33A, d2 denotes an opening width of the board hole portion 62A, and d3 denotes the diameter of the lead wire 70A. Then, the following inequality is preferably satisfied: $d1 > (d2 - d3)/2$.

When the spindle motor 2A is manufactured, the coil 37A, which includes the lead wire 70A, is preferably prepared first. The lead wire 70A includes the first solder portion 71A which has preferably been previously coated with the solder near a tip portion thereof. Next, the coil 37A is arranged above the base portion 31A. At this time, the lead wire 70A is drawn out downwardly through the base hole portion 61A and the board hole portion 62A.

Next, the lead wire 70A, which is now preferably drawn out beyond a lower surface of the circuit board 33A, is soldered to the circuit board 33A. When this soldering is carried out, the lead wire 70A is positioned such that the above inequality, $d1 > (d2 - d3)/2$, is satisfied. Thereafter, a unit including the base portion 31A, the coil 37A, and the circuit board 33A is immersed in a liquid, and ultrasonic wave vibration is applied to the liquid. In other words, the unit is subjected to ultrasonic cleaning.

In the present preferred embodiment, the second solder portion 72A rises along the first solder portion 71A to a level above the board hole portion 62A when the soldering is carried out. This results in an increase in an area where the lead wire 70A and the second solder portion 72A are in contact with each other. This contributes to reducing the likelihood of concentration of a stress on a boundary region between the lead wire 70A and the second solder portion 72A due to an exterior shock. This in turn contributes to preventing breakage of the lead wire 70A. At the time of the ultrasonic cleaning, it is possible to apply the ultrasonic wave vibration to the unit including the base portion 31A, the coil 37A, and the circuit board 33A while preventing breakage of the lead wire 70A.

Next, a more specific preferred embodiment of the present invention will now be described below.

Figure 2:
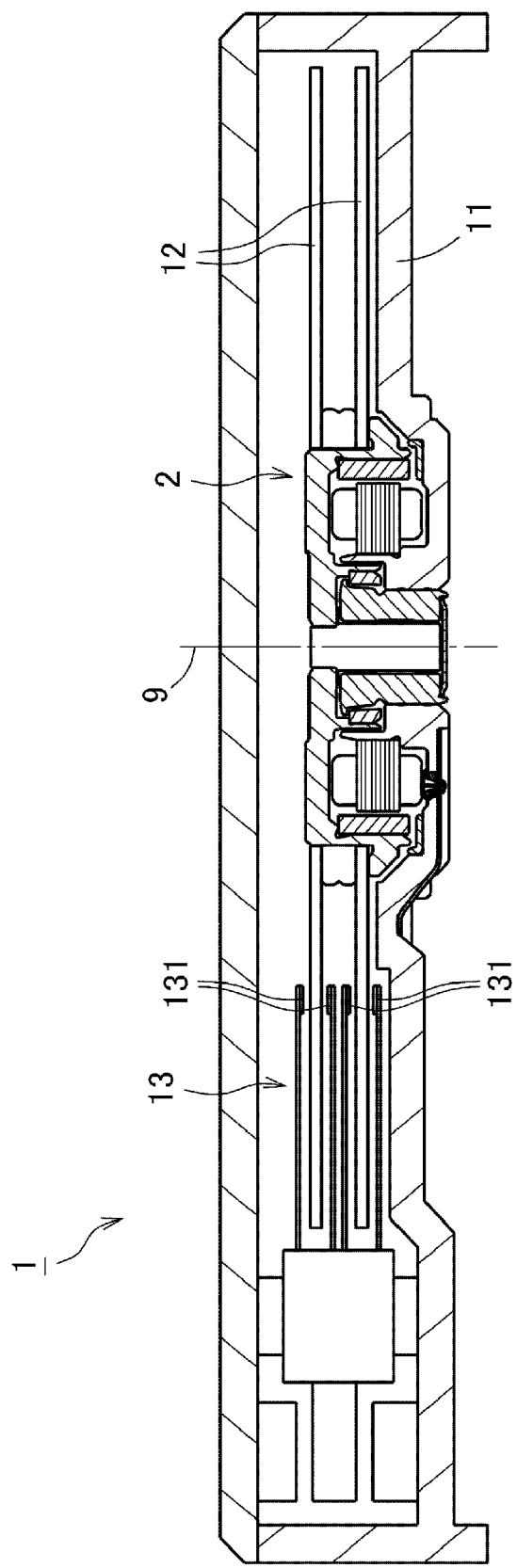
FIG. 2 is a vertical cross-sectional view of a disk drive apparatus according to a preferred embodiment of the present invention.

FIG. 2 is a vertical cross-sectional view of a disk drive apparatus 1 according to a preferred embodiment of the present invention. The disk drive apparatus 1 is an apparatus arranged to perform reading and writing of information from or to magnetic disks 12 while rotating the magnetic disks 12. As illustrated in FIG. 2, the disk drive apparatus 1 includes a housing 11, the magnetic disks 12, which are preferably two in number, for example, an access portion 13, and a spindle motor 2.

The housing 11 is preferably a case arranged to contain the two magnetic disks 12, the access portion 13, and the spindle motor 2. The spindle motor 2 is preferably arranged to rotate the two magnetic disks 12 about a central axis 9 while holding the magnetic disks 12. The access portion 13 is arranged to move a head 131 along a recording surface of each magnetic disk 12 to perform the reading and the writing of information from or to the magnetic disk 12. Note that the access portion 13 may be arranged to perform only one of the reading and the writing of information from or to the magnetic disks 12. Also note that the number of disks 12 may be any other desirable number other than two.

Figure 3:
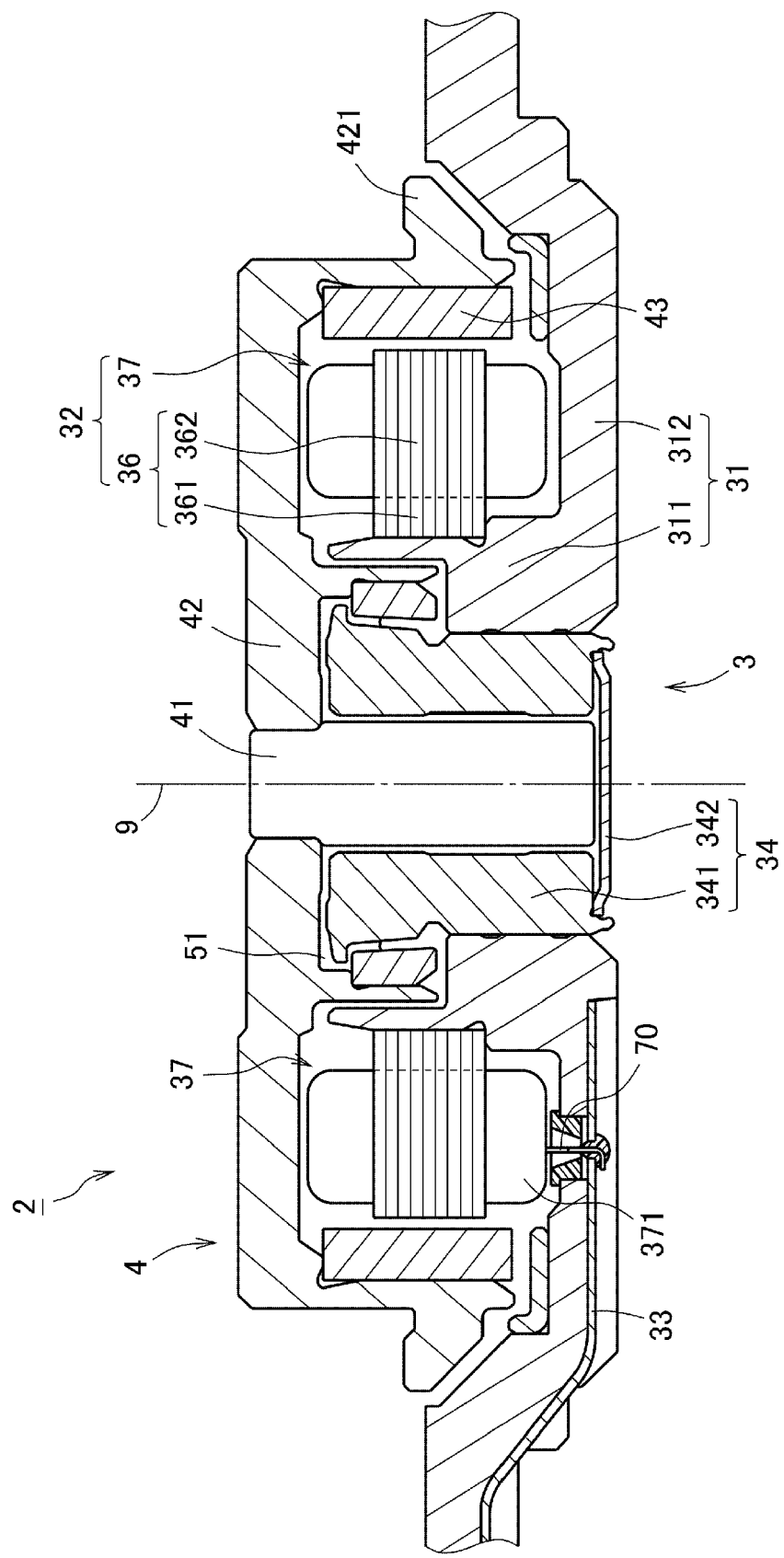
FIG. 3 is a vertical cross-sectional view of a spindle motor according to a preferred embodiment of the present invention.

Next, the structure of the spindle motor 2 will now be described below. FIG. 3 is a vertical cross-sectional view of a preferred embodiment of the spindle motor 2. As illustrated in FIG. 3, the spindle motor 2 includes a stationary portion 3 and a rotating portion 4. The stationary portion 3 is arranged to remain stationary relative to the housing 11 of the disk drive apparatus 1. The rotating portion 4 is supported to be rotatable with respect to the stationary portion 3.

The stationary portion 3 according to the present preferred embodiment preferably includes a base member 31, a stator unit 32, a circuit board 33, and a stationary bearing unit 34.

The base member 31 is arranged to serve as a base that supports the stator unit 32 and the stationary bearing unit 34. In the present preferred embodiment, the base member 31 is defined by a receiving portion of the housing 11. Note that the base member 31 may be defined by a separate member attached to the housing 11. The base member 31 is produced, for example, by a casing preferably made from, for example, a metal such as aluminum, an aluminum alloy, etc.

As illustrated in FIG. 3, the base member 31 preferably includes a cylindrical portion 311 and a bottom portion 312. The cylindrical portion 311 is a substantially cylindrical portion arranged around the central axis 9. The bottom portion 312 is preferably a substantially flat plate-shaped portion arranged to extend radially outward from a lower end portion of the cylindrical portion 311. Note that the terms "radial direction", "radial", and "radially" as used herein refer to directions perpendicular or substantially perpendicular to the central axis 9.

The stator unit 32 is arranged to generate magnetic flux in accordance with electrical driving currents. The stator unit 32 includes a stator core 36 and a plurality of coils 37. The stator core 36 is preferably defined by laminated steel sheets, i.e., a plurality of steel sheets placed one upon another in an axial direction. Note that the terms "axial direction", "axial", and "axially" as used herein refer to a direction along the central axis 9. The stator core 36 preferably includes an annular core back 361 and a plurality of tooth portions 362. The tooth portions 362 are arranged to project radially outward from the core back 361. The core back 361 is fixed to the cylindrical portion 311 of the base member 31.

The coils 37 are arranged above the bottom portion 312 of the base member 31. Each coil 37 is preferably defined by a conducting wire wound around a separate one of the tooth portions 362. An end portion of the conducting wire is drawn downwardly out of the base member 31, and connected to the circuit board 33. Hereinafter, a portion of the conducting wire which extends downward relative to a winding portion 371 of the coil 37 will be referred to as a "lead wire 70". The structure of the lead wire 70 and a surrounding area will be described in detail below.

The circuit board 33 is a board on which is mounted an electronic circuit configured to supply the drive currents to the coils 37. In the present preferred embodiment, a flexible printed circuit board (FPC), which is flexibly bendable, is preferably used as the circuit board 33. The circuit board 33 is fixed to a lower surface of the base member 31 through an adhesive or the like while being bent as illustrated in FIG. 3. Note that a rigid printed circuit board, which has a low flexibility, may be used as the circuit board 33 if so desired.

The stationary bearing unit 34 is a mechanism arranged to rotatably support a shaft 41, which defines a portion of the rotating portion 4. The stationary bearing unit 34 preferably includes a sleeve 341 and a cap 342. The sleeve 341 is a substantially cylindrical member fixed to an inside of the cylindrical portion 311 of the base member 31. The cap 342 is a member arranged to close an opening defined in a bottom portion of the sleeve 341. A gap defined between an inner circumferential surface of the sleeve 341 and an outer circumferential surface of the shaft 41, and a gap defined between an upper surface of the cap 342 and a lower surface of the shaft 41 are preferably filled with a lubricating oil 51.

The rotating portion 4 according to the present preferred embodiment preferably includes the shaft 41, a hub 42, and a rotor magnet 43.

The shaft 41 is a substantially columnar member arranged to extend in the vertical direction along the central axis 9. The shaft 41 is inserted inside the sleeve 341, and is rotatably supported by the stationary bearing unit 34.

The hub 42 is a member fixed to the shaft 41 and arranged to rotate together with the shaft 41. A disk holding portion 421 arranged to hold the magnetic disks 12 is preferably arranged in an outer circumferential portion of the hub 42.

The rotor magnet 43 is preferably an annular magnet fixed to the hub 42. An inner circumferential surface of the rotor magnet 43 is arranged radially opposite radially outer end surfaces of the tooth portions 362 of the stator core 36. In addition, the inner circumferential surface of the rotor magnet 43 is arranged to define a pole surface on which north and south poles alternate with each other.

Regarding the spindle motor 2 having the above-described structure, once the electrical drive currents are supplied to the coils 37 through the circuit board 33, radial magnetic flux is generated around the tooth portions 362 of the stator core 36. Then, interaction between the magnetic flux of the tooth portions 362 and that of the rotor magnet 43 produces a circumferential torque, so that the rotating portion 4 is caused to rotate about the central axis 9 with respect to the stationary portion 3. The magnetic disks 12 held by the disk holding portion 421 of the hub 42 are caused to rotate about the central axis 9 together with the rotating portion 4.

Figure 4:
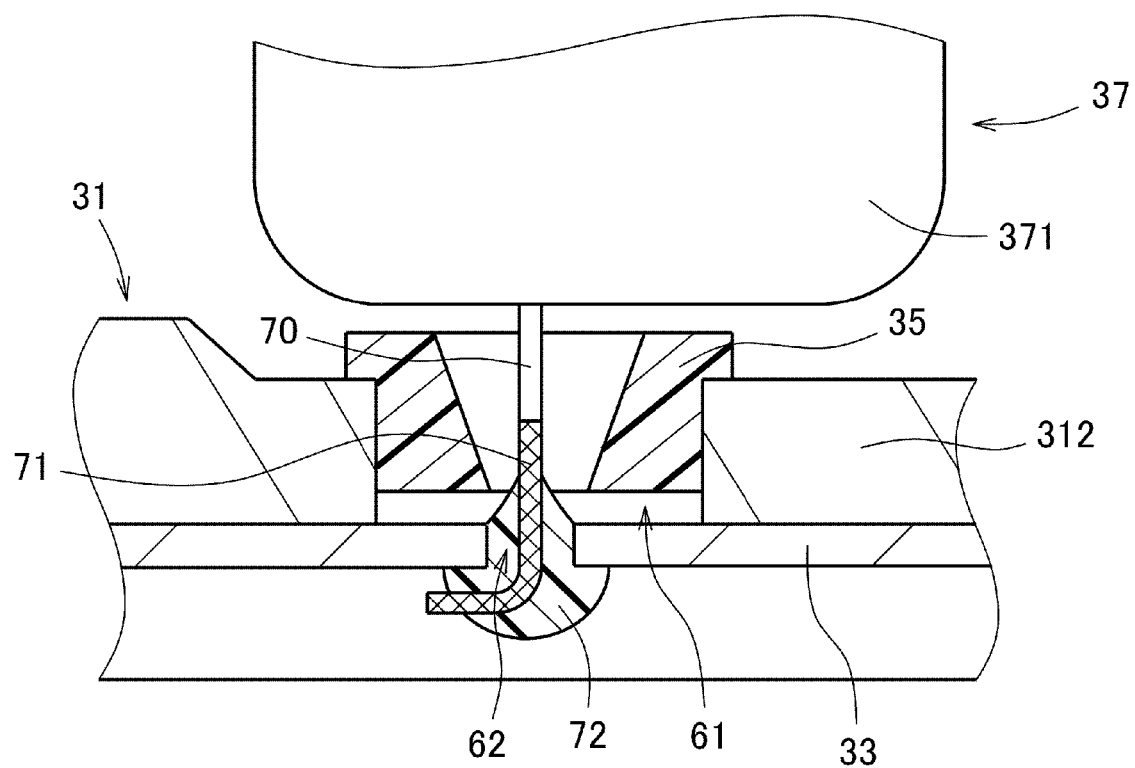
FIG. 4 is a partial vertical cross-sectional view of a stationary portion according to a preferred embodiment of the present invention.

Next, the structure of the lead wire 70 and the surrounding area will now be further described below. FIG. 4 is a partial vertical cross-sectional view of the stationary portion 3, illustrating a portion thereof near the lead wire 70.

As illustrated in FIG. 4, the base member 31 according to the present preferred embodiment includes a first through hole 61. The first through hole 61 is arranged to extend through the bottom portion 312 of the base member 31 in the vertical direction. In addition, the circuit board 33 according to the present preferred embodiment includes a second through hole 62. The second through hole 62 corresponds to the board hole portion 62A illustrated in FIG. 1. The second through hole 62 is arranged to extend through the circuit board 33 in the vertical direction at a position overlapping in an axial direction with the first through hole 61. In the example of FIG. 4, the second through hole 62 is arranged to have an opening width smaller than that of the first through hole 61.

The lead wire 70 extending from the coil 37 is arranged to pass through both the first through hole 61 and the second through hole 62 to be drawn out downwardly beyond a lower surface of the circuit board 33. A lower end portion of the lead wire 70 is then soldered to the lower surface of the circuit board 33.

In addition, in the present preferred embodiment, an insulating member 35 is fixed to an edge portion of the first through hole 61. The insulating member 35 is preferably a substantially tubular member made of an electrically insulating material such as, for example, a resin. The lead wire 70 is arranged to extend downward through an inside of the insulating member 35. The insulating member 35 therefore contributes to preventing the lead wire 70 from coming into direct contact with the base member 31 in the first through hole 61. This contributes to preventing damage to the lead wire 70, and at the same time to preventing any electrical connection between the base member 31 and the coil 37.

A surface of a portion of the conducting wire which defines the winding portion 371 of the coil 37 is preferably coated with an insulating film. This contributes to preventing an electrical short circuit from occurring between different portions of the conducting wire in the winding portion 371. Meanwhile, a portion of the lead wire 70 which is near a tip portion thereof is not coated with the insulating film, but is instead coated with a solder film. This solder film is preferably previously arranged on the portion of the lead wire 70 which is near the tip portion thereof before the lead wire 70 is soldered to the circuit board 33.

In other words, the lead wire 70 preferably includes, near the tip portion thereof, a first solder portion 71 that has been coated with a first solder. The first solder portion 71 is soldered to the lower surface of the circuit board 33 through a second solder portion 72. Each of the first solder and the second solder may preferably be a conventional solder including lead and tin, or may be an environmentally friendly, lead-free solder, for example.

By arranging the first solder portion 71 as described above, it is possible to eliminate a need to melt the insulating film when the above-described soldering is carried out using the second solder portion 72. This makes it possible to quickly solder the lead wire 70 to the circuit board 33. The wettability of the second solder portion 72 with respect to the first solder portion 71 is higher than the wettability of the second solder portion 72 with respect to the insulating film. Therefore, it is easy to adhere the second solder portion 72 to the first solder portion 71 when the soldering is carried out.

Referring to FIG. 4, an upper end portion of the first solder portion 71 is arranged above an upper surface of the circuit board 33. Accordingly, when the soldering is carried out, the second solder portion 72 as melted near the second through hole 62 rises along the first solder portion 71 to a level above the second through hole 62. The rise of the second solder portion 72 results in an increase in an area where the lead wire and the second solder portion 72 are in contact with each other. Moreover, a portion of the second solder portion 72 which is adhered to a surface of the first solder portion 71 above the second through hole 62 gradually decreases in thickness with increasing height. This results in a structure that makes it unlikely to allow a stress to be concentrated on a boundary region between the lead wire 70 and the second solder portion 72.

Figure 5:
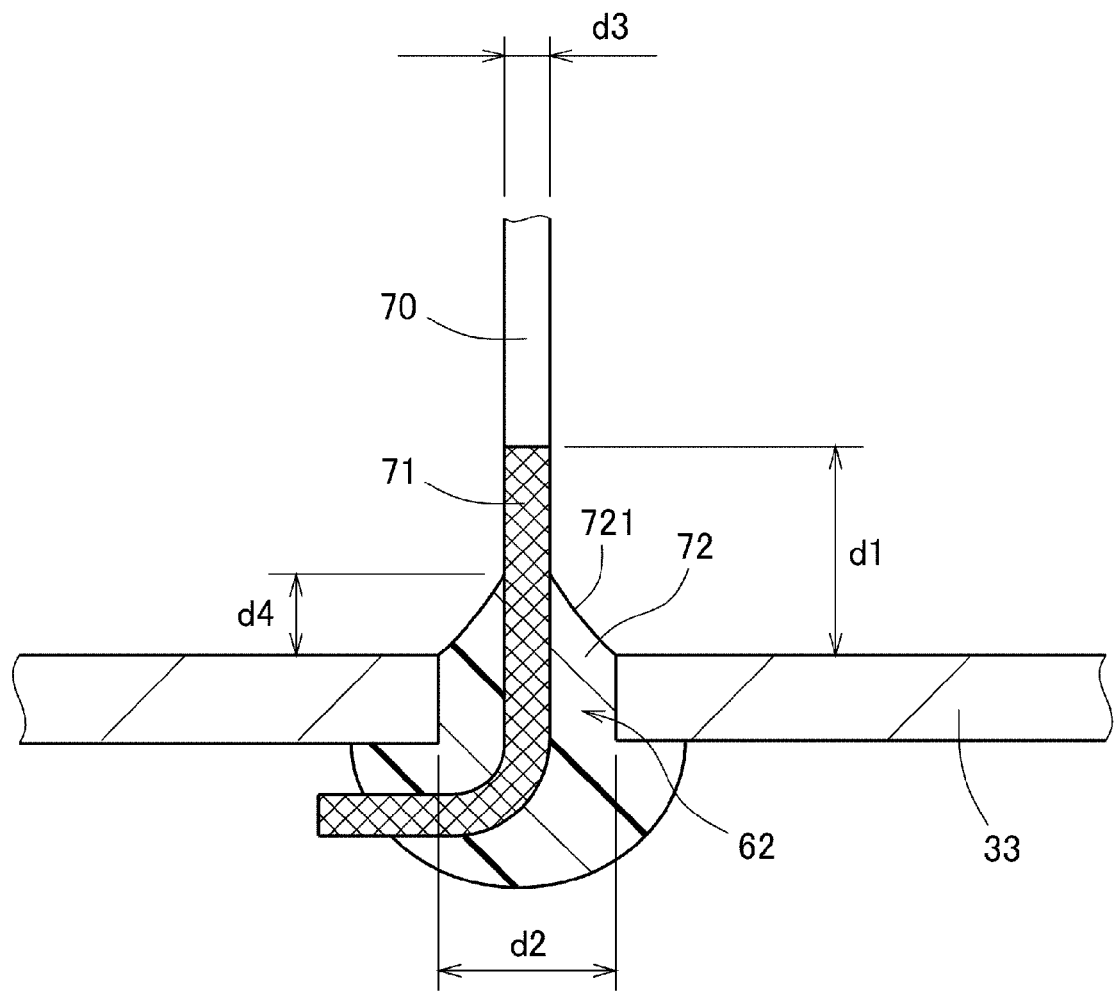
FIG. 5 is a partial vertical cross-sectional view of a circuit board and a lead wire according to a preferred embodiment of the present invention.
Figure 6:
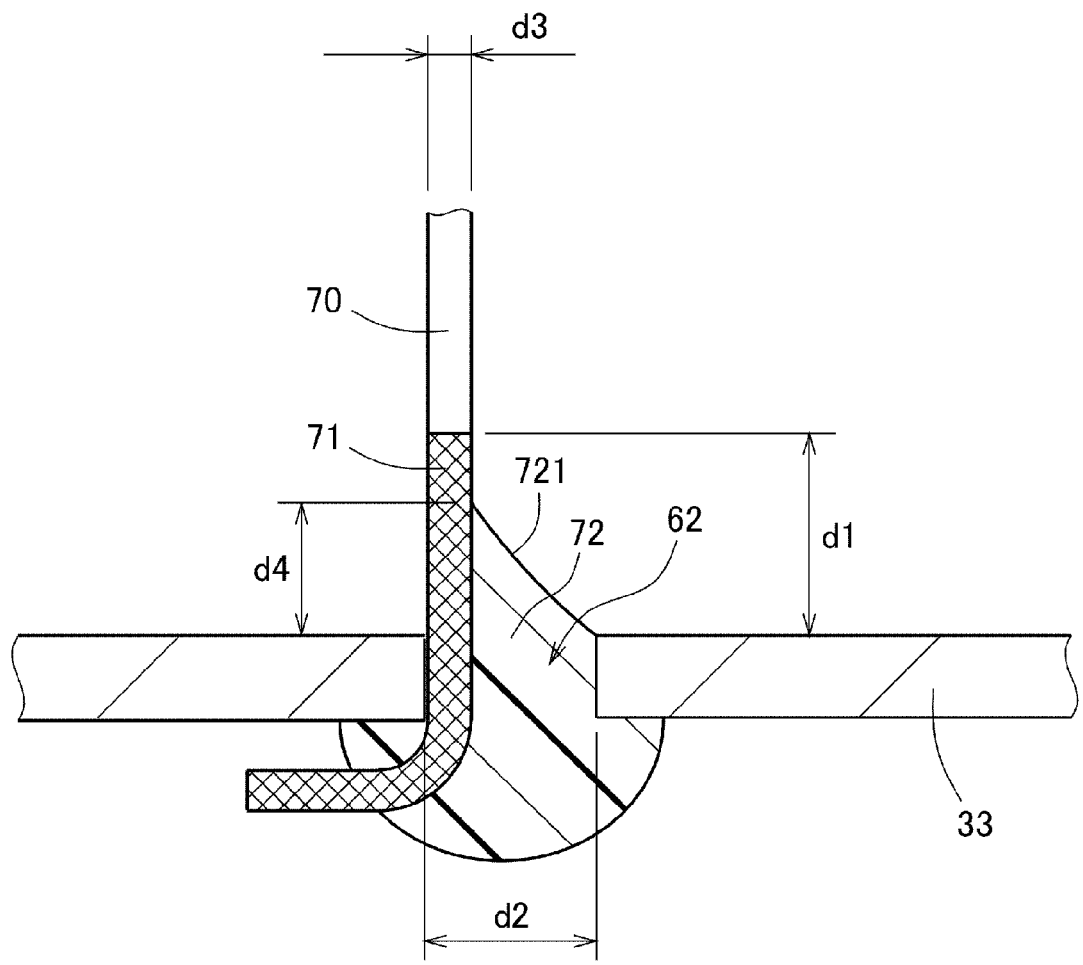
FIG. 6 is a partial vertical cross-sectional view of a circuit board and a lead wire according to a preferred embodiment of the present invention.

FIGS. 5 and 6 are each a diagram geometrically illustrating the height of the upper end portion of the first solder portion 71. In an example of a preferred embodiment of the present invention shown in FIG. 5, the lead wire 70 is arranged in the center of the second through hole 62. The second through hole 62 corresponds to the board hole portion 62A illustrated in FIG. 1. The second solder portion 72 is arranged to rise along the surface of the first solder portion 71 above the second through hole 62.

Assume here that d1 denotes the axial distance between the upper end portion of the first solder portion 71 and the upper surface of the circuit board 33, d2 denotes the opening width of the second through hole 62, d3 denotes the diameter of the lead wire 70, and d4 denotes the axial distance between an upper end portion of a rising surface 721 of the second solder portion 72 and the upper surface of the circuit board 33. Then, on the assumption that the rising surface 721 of the second solder portion 72 preferably has an inclination angle of 45 degrees, the following equation is satisfied: $d4=(d2-d3)/2$. If $d1>d4$, then the insulating film of the lead wire 70 is not in contact with the second solder portion 72, and the second solder portion 72 is allowed to rise to a sufficient degree. Therefore, it is preferable that the following inequality is satisfied: $d1>(d2-d3)/2$.

When the above inequality is satisfied, the second solder portion 72 is allowed to rise to a sufficient degree, and an effect of reducing the likelihood of the aforementioned stress concentration is achieved. This contributes to preventing breakage of the lead wire 70 due to, for example, an exterior shock. In particular, it is preferable that the upper end portion of the first solder portion 71 is arranged above an upper end portion of the second solder portion 72 after the second solder portion 72 becomes completely hardened after the lead wire 70 has been connected to the second solder portion 72 through the first solder portion 71.

Note that the first solder contributes to improving the strength of the lead wire 70 near the upper end portion of the second solder portion 72. The improvement in the strength of the lead wire 70 contributes to further reducing the likelihood of a breakage of the lead wire 70.

Meanwhile, in an example of FIG. 6, the lead wire 70 is arranged in a corner portion of the second through hole 62. The second through hole 62 corresponds to the board hole portion 62A illustrated in FIG. 1. In this case, on the assumption that the rising surface 721 of the second solder portion 72 preferably has an inclination angle of 45 degrees, the following equation is satisfied: $d4=d2-d3$. Therefore, in order to allow the second solder portion 72 to rise to a sufficient degree in a situation illustrated in FIG. 6, it is preferable that the following inequality is preferably satisfied: $d1>d2-d3$.

When the above inequality is satisfied, the second solder portion 72 is allowed to rise to a sufficient degree regardless of the position of the lead wire 70 in the second through hole 62. This contributes to reducing the likelihood of the stress concentration in the boundary region between the lead wire 70 and the second solder portion 72. This contributes to further reducing the likelihood of breakage of the lead wire 70 due to an exterior shock.

If the opening width d2 of the second through hole 62 is too small, an operation of inserting the lead wire 70 into the second through hole 62 will be difficult, and the extent of the rise of the second solder portion 72 will be slight. On the other hand, if the opening width d2 of the second through hole 62 is too large, the amount of the second solder portion 72 to be used will be too large, and the inclination angle of the rising surface 721 of the second solder portion 72 will be too small. The opening width d2 of the second through hole 62 is preferably set to an appropriate value in view of the above considerations. Specifically, the opening width d2 of the second through hole 62 is preferably in the range of about 0.4 mm to about 0.8 mm, for example. More preferably, the opening width d2 of the second through hole 62 is in the range of about 0.5 mm to about 0.7 mm, for example.

If the diameter d3 of the lead wire 70 is too small, electrical resistance of the lead wire 70 will be too great, and the likelihood of breakage of the lead wire 70 will increase. On the other hand, if the diameter d3 of the lead wire 70 is too large, an operation of wiring will be difficult. The diameter d3 of the lead wire 70 is preferably set to an appropriate value in view of the above considerations. Specifically, the diameter d3 of the lead wire 70 is preferably in the range of about 0.14 mm to about 0.2 mm, for example. More preferably, the diameter d3 of the lead wire 70 is in the range of about 0.15 mm to about 0.17 mm, for example.

In FIG. 4, the upper end portion of the first solder portion 71 is arranged below a lower end portion of the winding portion 371 of the coil 37. In other words, the first solder portion 71 is arranged such that the first solder portion 71 does not reach the winding portion 371 of the coil 37. The first solder portion 71 is thereby prevented from coming into contact with another portion of the conducting wire. The winding portion 371 of the coil 37 preferably is defined by only the portion of the conducting wire which is coated with the insulating film, and electrical insulation between different portions of the conducting wire is thereby ensured.

Furthermore, in the present preferred embodiment, the upper end portion of the first solder portion 71 is arranged above a lower end portion of the insulating member 35. Therefore, without the insulating member 35, the first solder portion 71 or the second solder portion 72 might be brought into contact with the base member 31, resulting in electrical connection therebetween. In view of this problem, the insulating member 35 is fixed to the edge portion of the first through hole 61 in the present preferred embodiment. That is, the upper end portion of the first solder portion 71 can be arranged at a level higher than that of the lower end portion of the insulating member 35. The insulating member 35 serves to prevent electrical connection between the base member 31 and each of the first solder portion 71 and the second solder portion 72.

Furthermore, in the present preferred embodiment, the second solder portion 72 is arranged to seal the second through hole 62, which defines a communicating channel between an interior space and an exterior space of the housing 11. Therefore, there is no need to prepare an additional sealant, aside from the second solder portion 72, to close the second through hole 62. Furthermore, in the present preferred embodiment, the second solder portion 72 is arranged to be in contact with an entire circumference of the lead wire 70 in the vicinity of the second through hole 62. This contributes to further reducing the likelihood of the stress concentration in the boundary region between the lead wire 70 and the second solder portion 72.

Figure 7:
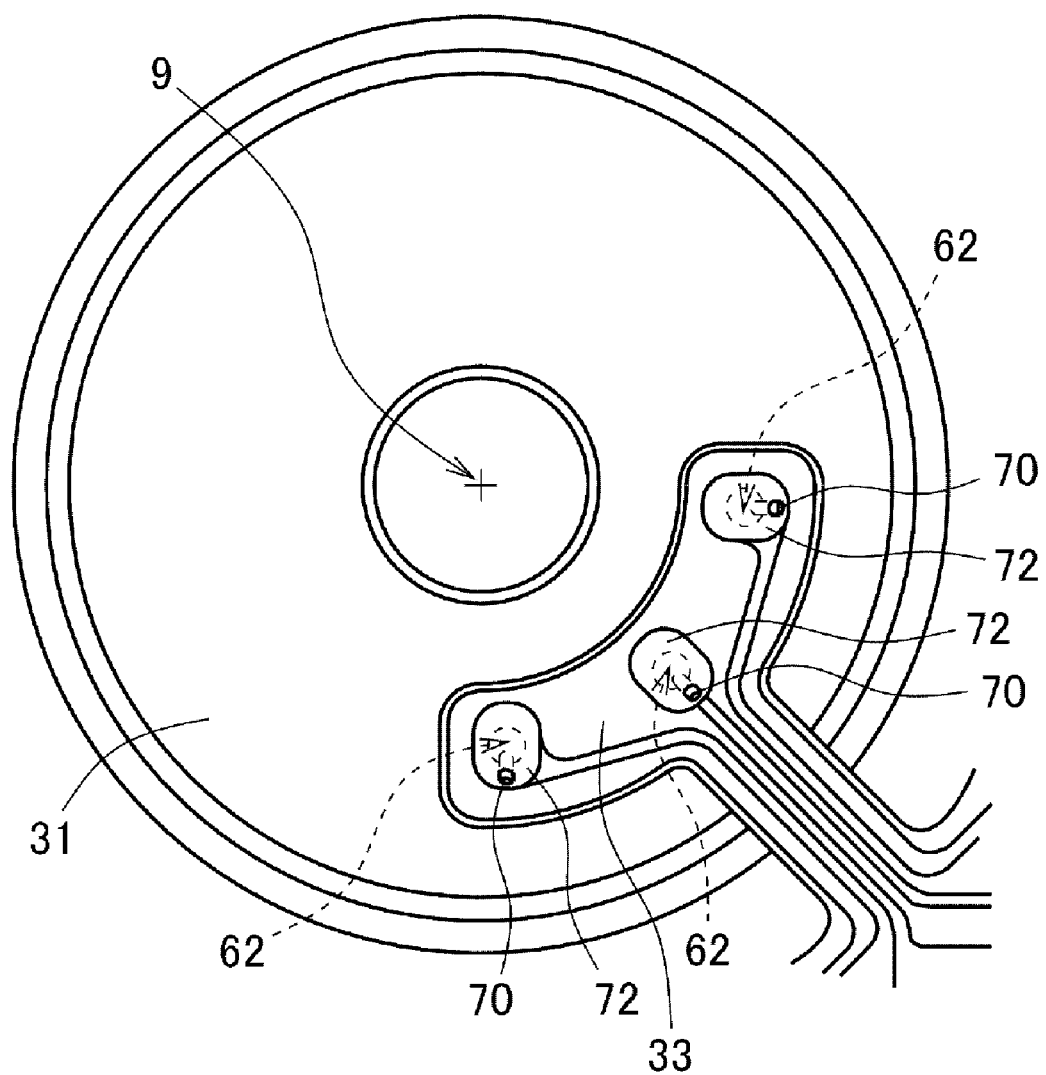
FIG. 7 is a partial bottom view of the spindle motor according to a preferred embodiment of the present invention.

FIG. 7 is a partial bottom view of a preferred embodiment of the spindle motor 2. In the present preferred embodiment, the coils 37 are preferably defined by three conducting wires, each of which is arranged to supply a separate three-phase current. Accordingly, three lead wires 70 are preferably drawn out beyond the lower surface of the base member 31. Each of the lead wires 70 includes the first solder portion 71 near a tip portion thereof. The base member 31 includes three first through holes 61, each of which is provided for a separate one of the three lead wires 70. Moreover, the circuit board 33 includes three second through holes 62, each of which is provided for a separate one of the three lead wires 70. Each second through hole 62 corresponds to the board hole portion 62A illustrated in FIG. 1. A lower end portion of each lead wire 70 is soldered to the circuit board 33 through the second solder portion 72 in the vicinity of the second through hole 62.

In the present preferred embodiment, the aforementioned relationship, $d1>(d2-d3)/2$, or more preferably this relationship, $d1>d2-d3$, is preferably satisfied with respect to each of the three lead wires 70. This contributes to reducing the likelihood of the stress concentration due to an exterior shock and also of a broken wire with respect to each of the three lead wires 70.

Figure 8:
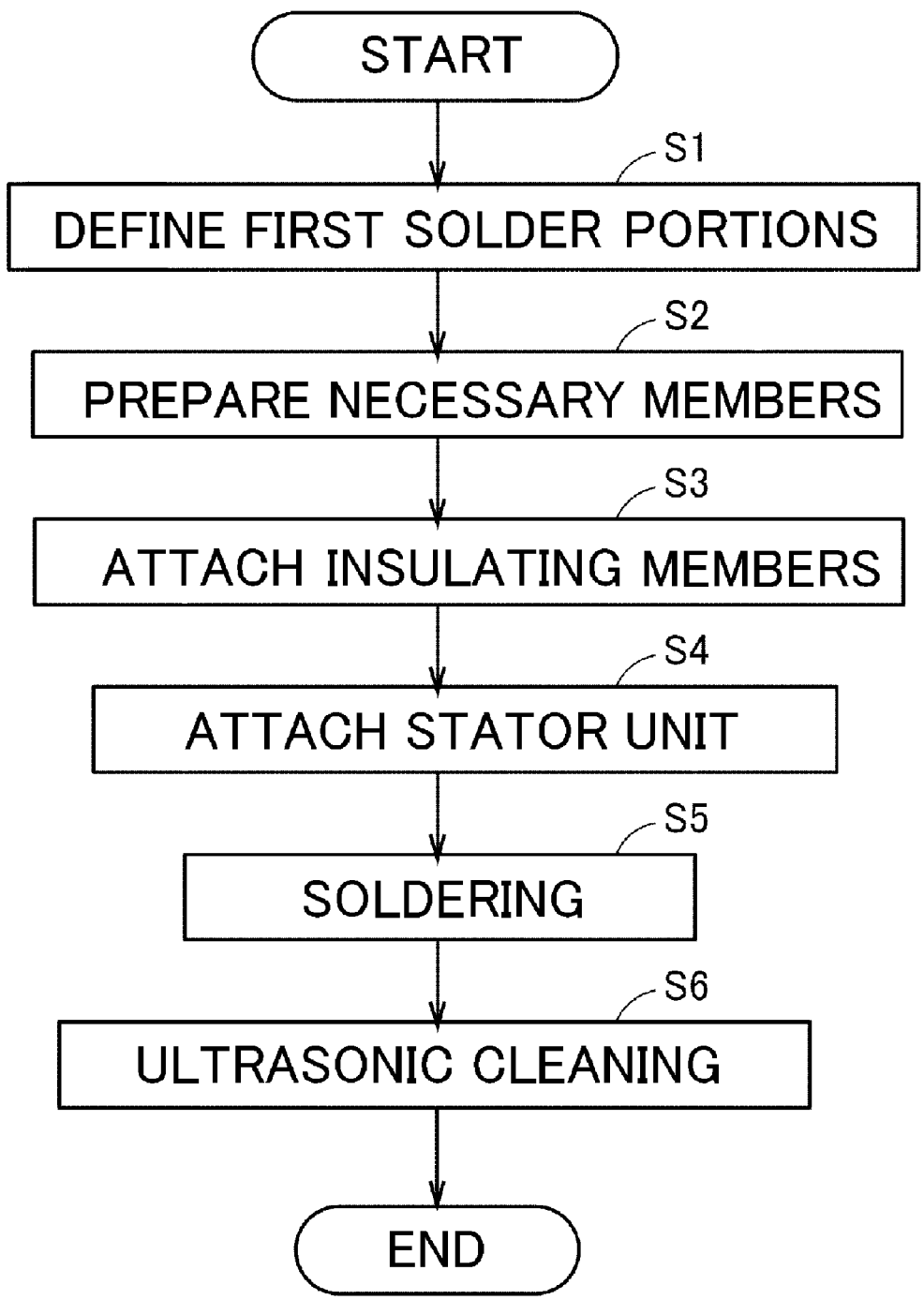
FIG. 8 is a flowchart illustrating a portion of a procedure of manufacturing the spindle motor according to a preferred embodiment of the present invention.

FIG. 8 is a flowchart illustrating a procedure of attachment of the stator unit 32 to the base member 31 and processes performed before and after the attachment. A portion of a procedure of manufacturing the spindle motor 2 will now be described below with reference to the flowchart of FIG. 8.

In an example of FIG. 8, first, the first solder portion 71 is arranged on each lead wire 70 of the coils 37 (step S1). Here, first, the stator unit 32 preferably including the stator core 36 and the coils 37 is prepared. Then, each lead wire 70 extending from a corresponding one of the coils 37 is immersed in the first solder, which is now melted and has a high temperature. As a result, the insulating film is melted near the tip portion of the lead wire 70, so that the conducting wire is exposed thereat. Thereafter, the stator unit 32 together with the lead wires 70 are lifted upward. As a result, the first solder adhered to a vicinity of the tip portion of each lead wire 70 is hardened to define the first solder portion 71.

Next, after the stator unit 32 subjected to the process of step S1, the base member 31, and the insulating members 35 are prepared (step S2). The base member 31 has the circuit board 33 fixed to the lower surface thereof through the adhesive. The bottom portion 312 of the base member 31 includes the first through holes 61. Moreover, the circuit board 33 includes the second through holes 62, each of which is preferably defined at a position overlapping with a corresponding one of the first through holes 61. Each second through hole 62 corresponds to the board hole portion 62A illustrated in FIG. 1. Each insulating member 35 is attached to the edge portion of a separate one of the first through holes 61 of the base member 31 (step S3).

Next, the stator unit 32 is attached to the base member 31 (step S4). Here, the core back 361 of the stator core 36 is preferably fitted to an outside of the cylindrical portion 311 of the base member 31, and the core back 361 and the cylindrical portion 311 are fixed to each other through, for example, an adhesive. As a result, the coils 37 are arranged over the bottom portion 312 of the base member 31. In addition, at this time, each lead wire 70 extending from a corresponding one of the coils 37 is passed through a corresponding one of the first through holes 61 of the base member 31 and a corresponding one of the second through holes 62 of the circuit board 33 to be drawn downwardly out of the circuit board 33.

Thereafter, each lead wire 70 is soldered to the circuit board 33 through the second solder portion 72 (step S5). Here, the upper end portion of the first solder portion 71 is positioned such that the aforementioned relationship, $d1>(d2-d3)/2$, or more preferably this relationship, $d1>d2-d3$, preferably is satisfied. Then, the first solder portion 71 is soldered to the circuit board 33 through the second solder portion 72 in the vicinity of the second through hole 62. The second solder portion 72 rises along the first solder portion 71 above the second through hole 62. This results in an increase in the area where the lead wire 70 and the second solder portion 72 are in contact with each other. This contributes to reducing the likelihood of a concentration of stress on the boundary region between the lead wire 70 and the second solder portion 72 due to an exterior shock.

In step S5, the lead wire 70 is preferably positioned such that the upper end portion of the first solder portion 71 is arranged above the lower end portion of the insulating member 35. In this case, it is possible to arrange the upper end portion of the first solder portion 71 at a high level while electrical connection between the base member 31 and each of the first solder portion 71 and the second solder portion 72 is prevented by the insulating member 35.

After the soldering is completed, finally, the ultrasonic cleaning is performed (step S6). Here, a unit including the base member 31, the stator unit 32, the circuit board 33, and the insulating members 35 is immersed in a cleaning fluid stored in a cleaning tank. Then, ultrasonic wave vibration is applied to the cleaning fluid in the cleaning tank to remove a minute extraneous material adhered to any portion of the unit.

As described above, the spindle motor 2 according to the present preferred embodiment is so structured that the likelihood of the stress concentration in the boundary region between the lead wire 70 and the second solder portion 72 is reduced. Therefore, in step S6, it is possible to apply high-power ultrasonic waves while preventing breakage of each lead wire 70.

Features of the above-described preferred embodiments and the modifications thereof may be combined appropriately as long as no conflict arises.

Note that a method of manufacturing a spindle motor according to a preferred embodiment of the present invention may not necessarily include all the above-described steps, i.e., steps S1 to S6. For example, a manufacturer of the spindle motor may be supplied with a stator unit 32 in which the first solder portions 71 are defined beforehand, and only steps S2 to S6 as described above may be performed.

Note that each of the first and second through holes 61 and 62 may be arranged right under a corresponding one of the coils 37, or may alternatively be arranged at a position displaced from a position right under the corresponding coil 37. Also note that each board hole portion according to a preferred embodiment of the present invention may be defined by a through hole with a closed periphery similar to the second through hole 62 according to the above-described preferred embodiment, or may alternatively be defined by, for example, a cut or a slit that preferably does not include a closed periphery.

Also note that the number of lead wires 70 included in the spindle motor 2 may be one, two, or any other desirable number more than three. Also note that two or more of the lead wires 70 may be arranged to pass through the same first and second through holes 61 and 62 to be drawn downwardly out of the circuit board 33.

Also note that a spindle motor according to a preferred embodiment of the present invention may be a so-called outer-rotor motor in which the rotor magnet 43 is arranged radially outward of the stator unit 32 as with the spindle motor 2 according to the above-described preferred embodiment, or may alternatively be a so-called inner-rotor motor in which a rotor magnet is arranged radially inward of a stator unit.

Also note that features of the above-described preferred embodiments and the modifications thereof may be combined appropriately as long as no conflict arises.

Various preferred embodiments of the present invention are applicable to a spindle motor, a disk drive apparatus, and a method of manufacturing the spindle motor, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
   a stationary portion; and
   a rotating portion supported to be rotatable about a central axis extending in a vertical direction with respect to the stationary portion; wherein
   the stationary portion includes:
      a base portion arranged to extend radially outward around the central axis;
      a coil arranged above the base portion; and
      a circuit board fixed to a lower surface of the base portion;
   a lead wire arranged to extend from the coil includes a first solder portion coated with a first solder;
   the base portion includes a base hole portion defined by a through hole;
   the circuit board includes a board hole portion defined by a through hole, a cut, or a slit, the board hole portion being defined at a position overlapping with the base hole portion;
   the lead wire is arranged to extend downward through the base hole portion and the board hole portion, and the first solder portion thereof is soldered to the circuit board through a second solder portion;
   an upper end portion of the first solder portion is arranged above an upper surface of the circuit board; and
   an inequality d1>(d2−d3)/2 is satisfied;
   where d1 denotes an axial distance between the upper end portion of the first solder portion and the upper surface of the circuit board, d2 denotes an opening width of the board hole portion, and d3 denotes a diameter of the lead wire.

2. The spindle motor according to claim 1, wherein d1>d2−d3.

3. The spindle motor according to claim 1, wherein the upper end portion of the first solder portion is arranged above an upper end portion of the second solder portion.

4. The spindle motor according to claim 1, wherein the upper end portion of the first solder portion is arranged below a lower end portion of a winding portion of the coil.

5. The spindle motor according to claim 1, further comprising an insulating member made of resin and fixed to an edge portion of the base hole portion;
wherein
   the base portion is made of metal; and
   the upper end portion of the first solder portion is arranged above a lower end portion of the insulating member.

6. The spindle motor according to claim 1, wherein
   the board hole portion is defined by a through hole with a closed periphery; and
   the board hole portion is sealed with the second solder portion.

7. The spindle motor according to claim 1, wherein
   a plurality of lead wires are provided, and a plurality of base hole portions and a plurality of board hole portions are arranged such that each pair of the base hole portion and the board hole portion is provided for a separate one of the lead wires; and
   the inequality, d1>(d2−d3)/2, is satisfied with respect to each of the lead wires.

8. A disk drive apparatus comprising:
   the spindle motor of claim 1;
   an access portion arranged to perform at least one of reading and writing of information from or to a disk supported by the rotating portion of the spindle motor; and
   a housing arranged to contain the spindle motor and the access portion.

9. The spindle motor according to claim 1, wherein the circuit board further includes a lower surface, the second solder portion extending from a position axially below the lower surface of the circuit board to a position axially above the upper surface of the circuit board.

10. A method of manufacturing a spindle motor including a base portion arranged to spread radially around a central axis extending in a vertical direction, a coil arranged above the base portion, and a circuit board fixed to a lower surface of the base portion, the method comprising the steps of:
   a) preparing the coil, the coil including a lead wire;
   b) arranging the coil above the base portion;

c) soldering the lead wire to the circuit board, with the lead wire drawn out beyond a lower surface of the circuit board; and d) immersing a unit including the base portion, the coil, and the circuit board in a liquid and applying ultrasonic wave vibration to the liquid; wherein the lead wire includes a solder portion previously coated with a solder, the solder portion being defined near a tip portion of the lead wire;

step b) includes passing the lead wire through a base hole portion defined by a through hole defined in the base portion, and a board hole portion defined by a through hole, a cut, or a slit defined in the circuit board, thereby drawing out the lead wire downwardly; and step c) includes positioning the lead wire such that $d1 > (d2-d3)/2$, where d1 denotes an axial distance between an upper end portion of the solder portion and an upper surface of the circuit board, d2 denotes an opening width of the board hole portion, and d3 denotes a diameter of the lead wire.

11. The method according to claim 10, wherein step c) includes positioning the lead wire such that $d1 > d2-d3$.

12. The method according to claim 10, further comprising a step e) of fixing an insulating member made of resin to an edge portion of the base hole portion before step c), wherein step c) includes positioning the lead wire such that the upper end portion of the solder portion is arranged above a lower end portion of the insulating member.

13. A spindle motor comprising:
a stationary portion; and
a rotating portion supported to be rotatable about a central axis extending in a vertical direction with respect to the stationary portion; wherein
the stationary portion includes:
a base portion arranged to extend radially outward around the central axis;
a coil arranged above the base portion; and
a circuit board fixed to a lower surface of the base portion;
a lead wire arranged to extend from the coil includes a first solder portion coated with a first solder;
the base portion includes a base hole portion defined by a through hole;
the circuit board includes an upper surface, a lower surface, and a board hole portion defined by a through hole, a cut, or a slit, the board hole portion being defined at a position overlapping with the base hole portion;
the lead wire is arranged to extend downward through the base hole portion and the board hole portion, and the first solder portion thereof is soldered to the circuit board through a second solder portion, the second solder portion extending from a position axially below the lower surface of the circuit board to a position axially above the upper surface of the circuit board; and
an upper end portion of the first solder portion is arranged above the upper surface of the circuit board.

14. The spindle motor according to claim 13, wherein an inequality $d1 > (d2-d3)/2$ is satisfied;
where d1 denotes an axial distance between the upper end portion of the first solder portion and the upper surface of the circuit board, d2 denotes an opening width of the board hole portion, and d3 denotes a diameter of the lead wire.

15. The spindle motor according to claim 14, wherein $d1 > d2-d3$.

16. The spindle motor according to claim 13, wherein the upper end portion of the first solder portion is arranged above an upper end portion of the second solder portion.

17. The spindle motor according to claim 13, wherein the upper end portion of the first solder portion is arranged below a lower end portion of a winding portion of the coil.

18. The spindle motor according to claim 13, further comprising an insulating member made of resin and fixed to an edge portion of the base hole portion;
wherein
the base portion is made of metal; and
the upper end portion of the first solder portion is arranged above a lower end portion of the insulating member.

19. The spindle motor according to claim 13, wherein
the board hole portion is defined by a through hole with a closed periphery; and
the board hole portion is sealed with the second solder portion.

20. A disk drive apparatus comprising:
the spindle motor of claim 13;
an access portion arranged to perform at least one of reading and writing of information from or to a disk supported by the rotating portion of the spindle motor; and
a housing arranged to contain the spindle motor and the access portion.

* * * * *